US008883108B2

(12) United States Patent
Serban et al.

(10) Patent No.: US 8,883,108 B2
(45) Date of Patent: Nov. 11, 2014

(54) CATALYST SUPPORTS

(75) Inventors: Manuela Serban, Glenview, IL (US); Lisa M. King, Westchester, IL (US); Alakananda Bhattacharyya, Glen Ellyn, IL (US); Tom N. Kalnes, LeGrange, IL (US); Kurt M. Vanden Bussche, Lake in the Hills, IL (US)

(73) Assignee: UOP LLC, Des Plaines, IL (US)

(*) Notice: Subject to any disclaimer, the term of this patent is extended or adjusted under 35 U.S.C. 154(b) by 289 days.

(21) Appl. No.: 13/160,168

(22) Filed: Jun. 14, 2011

(65) Prior Publication Data

US 2011/0243824 A1    Oct. 6, 2011

Related U.S. Application Data

(62) Division of application No. 12/555,340, filed on Sep. 8, 2009, now abandoned.

(60) Provisional application No. 61/138,152, filed on Dec. 17, 2008.

(51) Int. Cl.
| | | |
|---|---|---|
| B01D 53/48 | (2006.01) | |
| B01D 53/56 | (2006.01) | |
| B01J 8/00 | (2006.01) | |
| C01B 7/00 | (2006.01) | |
| B01D 53/02 | (2006.01) | |
| C07C 11/24 | (2006.01) | |
| B01J 35/00 | (2006.01) | |
| B01J 37/08 | (2006.01) | |
| B01J 35/02 | (2006.01) | |
| B01D 53/86 | (2006.01) | |
| B01J 37/02 | (2006.01) | |
| B01J 23/34 | (2006.01) | |
| B01J 35/10 | (2006.01) | |
| B01J 35/06 | (2006.01) | |
| B01J 21/06 | (2006.01) | |

(52) U.S. Cl.
CPC ........... *B01D 53/8603* (2013.01); *B01J 35/002* (2013.01); *B01J 37/08* (2013.01); *B01D 2255/2073* (2013.01); *B01D 2255/9205* (2013.01); *B01J 21/06* (2013.01); *B01J 35/023* (2013.01); *B01J 21/066* (2013.01); *B01J 37/0201* (2013.01); *B01D 2257/304* (2013.01); *B01J 23/34* (2013.01); *B01J 35/10* (2013.01); *B01D 2255/206* (2013.01); *B01J 35/06* (2013.01)
USPC ..................................................... 423/244.02

(58) Field of Classification Search
CPC ........ B01D 53/48; B01D 53/50; B01D 53/52; B01D 53/86; B01J 21/066; B01J 23/34
USPC ......... 502/300–304, 308, 309, 313, 314, 332, 502/334, 353–355, 439, 527.14, 527.24; 423/244.02, 244.1
See application file for complete search history.

(56) References Cited

U.S. PATENT DOCUMENTS

| | | | |
|---|---|---|---|
| 3,811,845 A | | 5/1974 | Nakamura |
| 4,173,549 A * | | 11/1979 | Kent et al. ..................... 502/324 |
| 4,200,609 A | | 4/1980 | Byrd |
| 4,585,899 A | | 4/1986 | Gelbein et al. |
| 5,075,160 A * | | 12/1991 | Stinton et al. ................. 442/247 |
| 5,221,484 A * | | 6/1993 | Goldsmith et al. ............ 210/650 |
| 5,804,153 A | | 9/1998 | Fang et al. |
| 7,052,532 B1 * | | 5/2006 | Liu et al. .......................... 96/154 |
| 7,288,686 B2 | | 10/2007 | Ryu |
| 2002/0004450 A1 * | | 1/2002 | Gaffney et al. ................ 502/256 |

FOREIGN PATENT DOCUMENTS

| | | |
|---|---|---|
| EP | 0904823 A2 | 3/1999 |
| EP | 1052019 A1 | 11/2000 |

OTHER PUBLICATIONS

Zircar Zirconia, Inc.—High Temperature Insulation, "Zironia Cloth Type ZYK-15", www.zircarzirconia.com/product-literature/zyk. php, accessed May 9, 2012, 4 pages.

* cited by examiner

*Primary Examiner* — Anthony J Zimmer
(74) *Attorney, Agent, or Firm* — Mark Goldberg

(57) ABSTRACT

This invention relates to a catalyst material, and its method of making and manufacture, useful for a diversity of chemical production processes as well as various emission control processes. More specifically, it relates to a catalyst composition, preferably comprising a metal oxide felt substrate, with one or more functional surface active constituents integrated on and/or in the substrate surface, which can be used in the removal of sulfur and sulfur compounds from hot gases as well as acting to trap solid particulates and trace metals within these hot gases.

4 Claims, No Drawings

CATALYST SUPPORTS

CROSS-REFERENCE TO RELATED APPLICATIONS

This application is a Division of copending application Ser. No. 12/555,340 filed Sep. 8, 2009, which application claims priority from Provisional Application No. 61/138,152 filed Dec. 17, 2008, now expired, the contents of which are hereby incorporated by reference.

BACKGROUND OF THE INVENTION

This invention relates to a catalyst material, and its method of making and manufacture, useful for a diversity of chemical production processes as well as various emission control processes. More specifically, it relates to a catalyst composition, preferably comprising a metal oxide felt substrate, with one or more functional surface active constituents integrated on and/or in the substrate surface, which can be used in the removal of sulfur from hot gases as well as acting to trap solid particulates and metals within these hot gases.

IGCC (Integrated Gasification Combined Cycle) is a type of power plant that gasifies coal into synthetic gas (syngas) to power a gas turbine. In these plants there is a need to remove a variety of impurities, including sulfur compounds from the syngas. After the impurities are removed, the heat from the gas turbine exhaust generates steam to run a steam turbine.

The integration of the combination of coal gasification, gas turbines, and steam turbines into electric power plants is new and presents engineering challenges. IGCC plants are to be contrasted to traditional coal powered power plants where the coal is pulverized and then burnt to produce steam to drive a turbine. Gasification is the thermal conversion of carbon-based materials at 760° to 1538° C. (1400° to 2800° F.), with a limited supply of pure oxygen, to a synthetic gas, also known as a syngas as compared to combustion which occurs when there is a surplus of oxygen.

Syngas typically contains about 35% $H_2$, 45% CO, 5% $H_2O$, 15% $CO_2$ with a small amount of methane, as well as impurities such as solid particulates, sulfur compounds (mainly $H_2S$ and COS) and nitrogen compounds as well as smaller quantities of other impurities. The syngas can be used as a fuel to generate power, or to make chemicals and fuels. The heating value is 264 kjoules (250 Btu/scf).

The hot exhaust gas from the gasification reaction is sent to a steam turbine which generates steam to produce electricity. In addition, the syngas is sent to a combustion turbine which turns a generator. The combined cycle is the combination of a simple cycle combustion turbine generator plus a steam turbine generator. The sulfur compounds need to be removed from the hot exhaust gas.

IGCC technology produces air emissions that are already considerably lower than required by current U.S. Clean Air standards. Significant reductions in sulfur dioxide ($SO_2$), nitrogen oxides ($NO_X$) and carbon monoxide (CO) are possible through use of IGCC plants, making them more advantageous than conventional coal power plants. Carbon dioxide ($CO_2$), which is considered a major source of global warming, can be captured more economically with IGCC than with conventional technologies. The $CO_2$ could be sequestered or sold in part as a by-product. Overall efficiency is approximately 40 to 45% of the energy value of coal converted to electricity. In comparison, conventional coal plants are approximately 30 to 35% efficient. Water requirements are typically about 50% less for IGCC applications than for conventional coal generation. Marketable by-products from the IGCC process can be sold, such as sulfur. However, IGCC facilities are more expensive to build than conventional coal plants. Only recently have suppliers begun to emerge that can offer comprehensive, integrated designs with packaged systems and compatible equipment. Due to the industry's limited experience with the technology, truly accurate cost estimates for construction and operating costs are not yet available for use in planning future facilities.

IGCC technology requires more frequent maintenance with longer maintenance outages, requiring that power be purchased from other resources when the IGCC plant is unavailable. Neither of the U.S.-based IGCC projects has used Powder River Basin, or western, coal, which is the type used most frequently in the Midwest. The industry is encouraging suppliers to offer performance contracts for next-generation IGCC plants, but for now, the risk of reduced reliability and availability add significant cost to the project's financing.

Only a few IGCC projects have been built world-wide despite the potential benefits of the technology. Among the improvements that are sought are methods of cleaning up the hot coal derived gases produced in an IGCC project. In prior art systems, wet scrubbing techniques have been used to clean up the gases. Unfortunately, these systems require first cooling of the gas and then a subsequent reheating step.

The clean-up of hot coal-derived gases originating from an Integrated Gasification Combined Cycle (IGCC) avoids the sensible heat loss due to the cooling and subsequent reheating associated with the wet scrubbing techniques using either chemical or physical solvents. If the fuel gas is cleaned with the conventional cold gas cleanup, the penalties in both thermal and overall process efficiencies will be larger for air-blown gasifiers compared to $O_2$-blown gasifiers, because the former produces over twice the volume of fuel gas produced by the latter. But nevertheless, both air- and $O_2$-blown gasifiers would benefit from the successful development of hot-gas cleanup techniques. Ideally, the clean-up is done at the highest inlet temperature at which the gas turbine fuel control and delivery systems can de be designed at. Hot gas cleanup may also avoid much of the operational complexity, space requirements, and capital costs associated with cool down/reheating systems or heat exchange systems. Other drivers for hot gas clean-up in IGCCs include avoiding the production of sour water (produced if the fuel gas is cooled below the dew point of water) and consequently the sour water treating, avoiding the production of "black-mud" (mixture of water-char ash) produced in water quenching or water scrubbing of particulates from the fuel gas. Also, if the particulates are removed dry via dry filtration systems, they could be recycled to the gasifier to improve fuel utilization and process efficiency.

Coal-derived fuel gases used for power generation or cogeneration have to be substantially cleaned before being either burned in a gas turbine or used for chemical synthesis, e.g., methanol, ammonia, urea production, Fischer-Tropsch synthesis. Cleanup techniques require removal of solid particulates, sulfur-containing gases, i.e., $H_2S$ and COS and all trace contaminants resulting from the gasification of coal, i.e., $NH_3$, HCN, alkali metals, metal carbonyls, Hg, As, and Se. The successful development of hot-gas cleanup techniques depends on the ability to remove all of the above at equally high temperatures.

SUMMARY OF THE INVENTION

This invention discloses a regenerable material acting as a high temperature sulfur sink as well as a filtering media for the solid particulates. The support used to disperse the active metal oxide phase is acting as a filtering media for the hot solid particulates and trace metals, and the active metal oxide phase dispersed on the support is acting as the sulfur sink. The preferred support material is a ceramic textile composed of 100% yttria-stabilized zirconia fibers which are mechanically interlocked to give a light weight, very flexible and porous media. The zirconia felts are designed for use in extremely corrosive environments, are stable in strong oxidizing or reducing conditions, and are not reactive to alkali vapors or salts. They contain no binder and they retain their fibrous nature up to 2480° C. In addition to zirconia, other refractory (metal) oxide felts, such as $Ce_2O_3$, $CeO_2$, $Y_2O_3$, $TiO_2$, $HfO_2$, $Al_2O_3$, $Nb_2O_5$, $La_2O_3$, $Yb_2O_3$, and mixed oxide felts like $Al_2O_3$—$SiO_2$, $HfO_2$—$CeO_2$, $Sm_2O_3$—$CeO_2$, $Yb_2O_3$—$CeO_2$ may be used. The metal oxide phase acting as the sulfur sink can be any metal oxide or mixed metal oxides, i.e., oxides of Zn, Fe, Cu, Co, Ni, Mo, Ca, Sr, Ba, Ce, Ti, V, W, or Mn, dispersed on the zirconia felt using any of the methods known in the art, i.e., wet impregnation, metal vapor deposition and subsequent metal oxidation. All commercial large-scale hot coal derived gas cleanup demonstration projects have so far failed because, among other reasons, of the poor attrition resistance of the tested sorbent materials. This problem is avoided by dispersing the active metal oxide used to chemically bind sulfur on the flexible felt material. This porous media can also be used to simultaneously trap the hot solid particulates.

DETAILED DESCRIPTION OF THE INVENTION

This invention involves a regenerable material acting as a high temperature sulfur sink as well as a filtering media for the solid particulates. The support used to disperse the active metal oxide phase is acting as a filtering media for the hot solid particulates and trace metals, and the active metal oxide phase dispersed on the support is acting as the sulfur sink. The support is a metal oxide felt substrate comprising a metal oxide selected from the group consisting of $ZrO_2$, $Ce_2O_3$, $CeO_2$, $Y_2O_3$, $TiO_2$, $HfO_2$, $Al_2O_3$, $Nb_2O_5$, $La_2O_3$, $Yb_2O_3$, and mixed oxide felts like $Al_2O_3$—$SiO_2$, $HfO_2$—$CeO_2$, $Sm_2O_3$—$CeO_2$, $Yb_2O_3$—$CeO_2$.

The preferred support material is a ceramic textile composed of 100% yttria-stabilized zirconia fibers which are mechanically interlocked to give a light weight, very flexible and porous media. The zirconia felts are designed for use in extremely corrosive environments, are stable in strong oxidizing or reducing conditions, and are not reactive to alkali vapors or salts. They contain no binder and they retain their fibrous nature up to 2480° C. In addition to zirconia, other refractory (metal) oxide felts, such as $Ce_2O_3$, $CeO_2$, $Y_2O_3$, $TiO_2$, $HfO_2$, $Al_2O_3$, $Nb_2O_5$, $La_2O_3$, $Yb_2O_3$, and mixed oxide felts like $Al_2O_3$—$SiO_2$, $HfO_2$—$CeO_2$, $Sm_2O_3$—$CeO_2$, $Yb_2O_3$—$CeO_2$ may be used. The metal oxide phase acting as the sulfur sink can be any metal oxide or mixed metal oxides, i.e., oxides of Zn, Fe, Cu, Co, Ni, Mo, Ca, Sr, Ba, Ce, Ti, V, W, or Mn dispersed on the zirconia felt using any of the methods known in the art, i.e., wet impregnation, metal vapor deposition and subsequent metal oxidation. All commercial large-scale hot coal derived gas cleanup demonstration projects have so far failed because, among other reasons, of the poor attrition resistance of the tested sorbent materials. This problem is avoided by dispersing the active metal oxide used to chemically bind sulfur on the flexible felt material. This porous media can also be used to simultaneously trap the hot solid particulates.

The metal oxide felt material used in the present invention may comprise layers having a thickness from about 0.25 to about 6.35 mm and preferably the thickness of the layers is from about 1.27 to about 3.81 mm. The metal oxide felt material has a bulk porosity from about 50 to 100% and preferably from about 88 to 96%. The bulk density of the metal oxide felt material is from about 128 to 1073 grams/liter and preferably from about 160 to 400 grams per liter. The metal oxide felt material has a high melting point in the range from 1500° to 5000° C.

The catalytic material that is deposited on the metal oxide felt material is selected from the group consisting of metals, metal oxides, metal sulfides, mixed metal oxides and mixed metal sulfides. Catalytic materials for use in removal of sulfur compounds are selected from the group consisting of metals, metal oxides, metal sulfides, mixed metal oxides and mixed metal sulfides of Zn, Fe, Cu, Co, Ni, Mo, Ca, Sr, Ba, Ce, Ti, V, W, or Mn. Preferably the catalytic active phases for the removal of sulfur compounds are oxides of Mn. The catalytic active phase can be deposited on the metal oxide felt material using any of the methods known in the art, i.e., wet impregnation, metal vapor deposition and subsequent metal oxidation.

In an embodiment of the present invention, one process of making the active metal oxide phase supported on the refractory metal oxide felt support is disclosed. The process comprises an aqueous impregnation of the active metal oxide phase onto the metal felt support, followed by a (high temperature of about 800° C.) heat treatment.

In another embodiment of the present invention, the active metal oxide phase coating the metal oxide felt support fibers is porous, allowing the unhindered diffusion and easy access of the sulfur compounds contained in the gaseous stream to the catalytic active metal oxide sites dispersed on the metal oxide felt support.

Yet another embodiment of the invention, involves the use of the composite materials of the present invention in the treatment of a hot gaseous stream with the exposure of the hot gaseous stream to a composite material comprising a metal oxide felt substrate and a catalytic material wherein the treatment includes removal of sulfur compounds and solid particulates from a hot gas that may be at a temperature from about 250° to 850° C. A typical gaseous stream comprises carbon monoxide, carbon dioxide, hydrogen, and sulfur compounds. The gaseous stream may comprise a fuel gas or a synthesis gas comprising hydrogen, carbon monoxide, sulfur-containing compounds and impurities like solid particulates and trace metals.

EXAMPLE 1

Preparation of Mn Oxide Supported on Yttria Stabilized Zirconia Felt

The Mn oxide supported on yttria stabilized zirconia felt catalyst was prepared by cutting the yttria stabilized zirconia felt into approximately 0.25 inch squares. To the cut felt squares, 36.3 g of an 0.5 M aqueous $Mn(OAc)_2 \cdot 4H_2O$ solution was added slowly with gentle stirring. The felt support squares were allowed to soak in the aqueous Mn acetate solution for 24 hours at room temperature with periodic gentle stirring, after which the mixture was dried at 100° C. for 4 hours. The dry impregnated felt support squares were then calcined in flowing air for 2 hours at 800° C.

The Mn oxide supported on yttria stabilized zirconia felt catalyst showed characteristic lines at 23.2±0.5 deg. 2-theta, 28.942±0.5 deg. 2-theta, 30.220±0.5 deg. 2-theta, 33.039±0.5 deg. 2-theta, 35.060±0.5 deg. 2-theta, 38.303±0.5 deg. 2-theta, 45.243±0.5 deg. 2-theta, 49.441±0.5 deg. 2-theta, 50.318±0.5 deg. 2-theta, 55.261±0.5 deg. 2-theta, 57.024±0.5 deg. 2-theta, 59.779±0.5 deg. 2-theta, 62.779±0.5 deg. 2-theta, 65.841±0.5 deg. 2-theta, under X-Ray Diffraction.

EXAMPLE 2

The material prepared via the method described in Example 1 was used for the removal of sulfur from a synthetic fuel gas with 1.35% $H_2S$. The material was tested in 5.5 sulfidation-oxidation cycles at atmospheric pressure in an alumina AD-998 reactor. The sulfidation step was done at 750° C. and 1600 $h^{-1}$ space velocity with fuel gas simulating an air-blown gasifier (1.35% $H_2S$+13.3% $H_2$+13.14% CO+13.5% $CO_2$+59% $N_2$). Under these reducing conditions, the active oxide phase for the sulfidation reaction is Mn(II)O. The 22 wt-% Mn dispersed on the yttria stabilized zirconia felt support gives a maximum theoretical sulfur capacity of 12 wt-% S. The regeneration was performed in-situ with lean air (2% $O_2$ in $N_2$) at 800° C. and 1600 $h^{-1}$ space velocity. The Mn-zirconia felt sorbent can easily be cycled between the oxide and sulfide phases with 100% S uptake, i.e., 11.9 wt-% S in all six sulfidation cycles. With this particular space velocity (1600 $h^{-1}$) the sample is fully sulfided in 4 hours and fully regenerated in 2.5 to 3 hours with $SO_2$ being the only off-gas produced. The oxidation reaction is extremely exothermic (Delta H=−133.7 kcal/mol at 800° C.), however the exotherm was only 4° C. because of the low $O_2$ concentration in the regeneration gas. In accordance with the gas chromatograph analysis and the S LECO measurements, the XRD analysis of the six times sulfided Mn/zirconia felt material suggested that the sulfidation was complete. After a six cycles test, the zirconia felt structure remained intact and the only manganese phase detected was MnS with no MnO left behind. After five oxidation cycles, the reactor was unloaded and re-packed for the sixth sulfidation cycle. The XRD spectra of the five times oxidized material indicated that the sulfided Mn was completely oxidized to $Mn_2O_3$ (which is further fully reduced to Mn(II)O in the presence of the reducing fuel gas during the sulfidation cycle).

High Resolution Scanning Electron Microscopy (HR-SEM) image reveals that the Mn metal oxide active phase completely coats the fibers of the zirconia felt support. The Backscattered Electron image of a cross-section of the Mn metal oxide on the zirconia felt material indicates that the metal oxide layer is very porous, allowing thus the unhindered diffusion of the S-containing gas to the active Mn metal oxide phase. As a result, the Mn metal oxide dispersed on the zirconia felt support has more sulfur absorbing capacity than metal on traditional bulk zirconia, freshly precipitated or amorphous. The test results are summarized in Table 1.

TABLE 1

| Cycle | Wt-% S loading before sulfur breakthrough | Wt-% total S loading |
|---|---|---|
| 1 | 2.65 | 12 |
| 2 | 2.65 | 11.9 |
| 3 | 2.65 | 11.3 |
| 6 | 2.65 | 11.5 |

EXAMPLE 3

The material prepared via wet impregnation described in Example 1 was used for the removal of sulfur from a synthetic fuel gas at 750° C. and 800 $h^{-1}$ space velocity with fuel gas simulating an air-blown gasifier (1.35% $H_2S$+13.3% $H_2$+13.14% CO+13.5% $CO_2$+59% $N_2$). Decreasing the space velocity from 1600 to 600 $h^{-1}$ increased the breakthrough time (the time with zero ppm $H_2S$ in the effluent gas) from about 38 minutes (with 2.65 wt-% S loading) to greater than 180 minutes (with about 5 wt-% S loading). Table 2 summarizes the test results.

TABLE 2

| Space Velocity ($h^{-1}$) | Wt-% S loading before sulfur breakthrough | Wt-% total S loading |
|---|---|---|
| 800 | 2.65 | 11.9 |
| 1600 | 5 | 12 |

The invention claimed is:

1. A method for treating a hot gas consisting of exposing said hot gas to a composite material consisting of a metal oxide felt substrate and a catalytic material wherein said treating includes removal of sulfur compounds, and solid particulates, and metals from said hot gas wherein said metal oxide felt substrate comprises yttria stabilized $ZrO_2$ and the catalytic material comprises oxides of Mn, and said metal oxide felt substrate and catalytic material shows characteristic lines at 23.2±0.5 deg. 2-theta, 28.942±0.5 deg. 2-theta, 30.220±0.5 deg. 2-theta, 33.039±0.5 deg. 2-theta, 35.060±0.5 deg. 2-theta, 38.303±0.5 deg. 2-theta, 45.243±0.5 deg. 2-theta, 49.441±0.5 deg. 2-theta, 50.318±0.5 deg. 2-theta, 55.261±0.5 deg. 2-theta, 57.024±0.5 deg. 2-theta, 59.779±0.5 deg. 2-theta, 62.779±0.5 deg. 2-theta, 65.841±0.5 deg. 2-theta, under X-Ray Diffraction.

2. The method of claim 1 wherein said hot gas is at a temperature from about 250° to 850° C.

3. The method of claim 1 wherein said hot gas is a synthesis gas.

4. The method of claim 1 wherein said composite material both catalyzes a reaction to remove sulfur compounds and traps solid particulates and metals contained in said hot gas.

* * * * *